(12) United States Patent
Tanabe (10) Patent No.: US 8,209,519 B2
(45) Date of Patent: Jun. 26, 2012

(54) SUSPENDING WRITE BACK OF VALID DATA IN PIPELINE REGISTER TO REGISTER FILE AND CANCELLING WHEN OVERWRITTEN BY SUBSEQUENT INSTRUCTION

(75) Inventor: Jun Tanabe, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/187,899

(22) Filed: Jul. 21, 2011

(65) Prior Publication Data

US 2011/0276788 A1 Nov. 10, 2011

Related U.S. Application Data

(62) Division of application No. 12/352,154, filed on Jan. 12, 2009, now Pat. No. 8,019,974.

(30) Foreign Application Priority Data

Jan. 17, 2008 (JP) ................................. 2008-008504

(51) Int. Cl.
*G06F 9/38* (2006.01)
(52) U.S. Cl. .................... 712/218; 712/E9.045; 713/320
(58) Field of Classification Search ......................... None
See application file for complete search history.

(56) References Cited

U.S. PATENT DOCUMENTS

| | | | |
|---|---|---|---|
| 5,522,084 A | 5/1996 | Ando | |
| 5,553,015 A * | 9/1996 | Elliott et al. | 708/498 |
| 5,590,365 A | 12/1996 | Ide et al. | |
| 5,748,935 A | 5/1998 | Tremblay et al. | |
| 5,805,852 A | 9/1998 | Nakanishi | |
| 5,842,036 A | 11/1998 | Hinton et al. | |
| 5,872,949 A | 2/1999 | Kikuta et al. | |
| 6,513,109 B1 * | 1/2003 | Gschwind et al. | 712/200 |
| 7,380,103 B2 * | 5/2008 | Henry et al. | 712/218 |
| 2007/0079076 A1 * | 4/2007 | Zhang | 711/143 |

FOREIGN PATENT DOCUMENTS

| | | |
|---|---|---|
| JP | 8-255079 | 10/1996 |
| JP | 9-305402 | 11/1997 |

OTHER PUBLICATIONS

Japanese Office Action issued Oct. 25, 2011, in Patent Application No. 2008-008504 (with English-language translation).

* cited by examiner

*Primary Examiner* — Kenneth Kim (74) *Attorney, Agent, or Firm* — Oblon, Spivak, McClelland, Maier & Neustadt, L.L.P.

(57) ABSTRACT

A pipeline processor has a first stage to read data from a general purpose register unit, a second stage to execute instruction, and a third stage to write back the data into the general purpose register unit. A pipeline register retains data obtained by executing the second stage. The pipeline register stores a data validity flag. A WRITE suspension unit suspends execution of writing the retained data into a general purpose register of the general purpose register unit until the retained data is rewritten by a subsequent instruction, even if the data validity flag indicates "valid." A data invalidation unit cancels the execution of writing the data retained in the pipeline register into the general purpose register into which the data is to be written by a preceding instruction and invalidates the retained data, when data is written into the general purpose register by the subsequent instruction.

18 Claims, 4 Drawing Sheets

SUSPENDING WRITE BACK OF VALID DATA IN PIPELINE REGISTER TO REGISTER FILE AND CANCELLING WHEN OVERWRITTEN BY SUBSEQUENT INSTRUCTION

CROSS REFERENCE TO RELATED APPLICATION

This application is a divisional application of U.S. application Ser. No. 12/352,154, filed Jan. 12, 2009, which is based upon and claims the benefit of priority from the prior Japanese Patent Application No. 2008-8504, filed on Jan. 17, 2008, the entire contents of which are incorporated herein by reference.

FIELD OF THE INVENTION

The invention relates to a pipeline processor which is provided with a pipeline processor having multiple stages.

DESCRIPTION OF THE BACKGROUND

A computer uses a processor to perform data processing according to instructions. A pipeline processor is known as a kind of processor.

A pipeline processor improves efficiency of executing instructions by performing parallel processing in stages having a series relationship. The stages are separated from each other by pipeline registers. Operation results produced by the instructions are written into a general purpose register.

One of the factors that cause performance deterioration of a pipeline processor is data hazard. The data hazard occurs when data dependency exists in a series of instructions to be executed consecutively. When two instructions have such a relationship that a subsequent instruction has to use an operation result of a preceding instruction, a short interval between the instructions leads to a state in which execution of the subsequent instruction is stopped until the operation result of the preceding instruction is written to the general purpose register.

An approach to reduce influence of such data hazard is bypassing. The bypassing is a technique to utilize data being processed in a pipeline, without waiting the data to be written into the general purpose register. Thus, the subsequent instruction can use data before the operation result produced by the preceding instruction is written into the general purpose register. The use of bypassing enables arithmetic processing to be performed continuously without stopping the pipeline.

A bypass circuit is provided to enable the bypassing. The bypass circuit is a circuit to transfer data produced in a mid-stage in a pipeline to a stage in a pipeline to execute a subsequent instruction. The latter stage is a stage, for example, to read data from the general purpose register.

As a processor becomes faster and more sophisticated, power consumption of the processor tends to increase. Thus, reduction in power consumption of the processor has been desired.

A technique to reduce power consumption of a pipeline processor having a bypass circuit is described on page 4 and FIG. 1 in Japanese Patent Application Publication No. 9-91140.

The publication discloses that a validity testing logic is provided in an instruction decoder to decode and output instructions.

The validity testing logic is designed to determine the validity of an instruction to a register according to an inputted instruction. If a determination result of the validity testing logic does not show the validity, data is not read from the general purpose register.

One of the cases that the validity testing logic does not show the validity is the case that the instruction does not use the general purpose register. Another of the cases is the case that bypassed data is used by operation of the bypass circuit. When the bypass circuit operates, data is not read from the general purpose register. As a result, power consumption is reduced by the amount to be used for the reading.

Even in the pipeline processor disclosed in the publication, the bypass circuit can function effectively only when there is an extremely short execution interval between preceding and subsequent instructions that have data dependency. In a case where any other instructions are issued between the preceding and the subsequent instructions, the operation result of the preceding instruction is written into the general purpose register by the time when the subsequent instruction is executed.

Thus, data does not remain in the pipeline in which the preceding instruction is processed. Consequently, execution of the subsequent instruction requires the operation result produced by the preceding instruction and to be read from the general purpose register to which the operation result has been written.

When there is a long execution interval between the instructions having data dependency, stored data is read from the general purpose register to cause power consumption for the reading.

When a subsequent instruction is an instruction to overwrite the general purpose register on which a write has been performed by a preceding instruction, an unnecessary writing is performed into the general purpose register by the preceding instruction, and power consumption occurs for the writing.

SUMMARY OF THE INVENTION

An aspect of the present invention provides a pipeline processor including a first stage to read data from a general purpose register unit, a second stage to execute instruction, and a third stage to write back data into the general purpose register unit, the pipeline processor, which comprises a first pipeline register to retain data obtained by the execution in the second stage and to allow the data to be written back into the general purpose register unit, the first pipeline register being provided between the second stage and the third stage, the first pipeline register including a first area to store a data validity flag indicating validity of the retained data and a second area to store a WRITE control flag to control writing the retained data into the general purpose register unit, and, the data retained in the first pipeline register being allowed to be written back into the general purpose register unit when the WRITE control flag indicates "valid", and a bypass circuit to supply the data retained in the first pipeline register to the second stage when the data validity flag indicates "valid," wherein the first pipeline register continues to retain the retained data even after the writing of the retained data into the general purpose register unit, and the first pipeline register supplies the retained data to the second stage through the bypass circuit at the time of executing a subsequent instruction having data dependency on a preceding instruction.

Another aspect of the present invention provides a pipeline processor including a first stage to read data from a general purpose register unit, a second stage to execute instruction, and a third stage to write back the data into the general purpose register unit, the pipeline processor, which comprises a first pipeline register provided between the second stage and the third stage, the first pipeline register including a first area to store a data validity flag indicating validity of data retained by the first pipeline register and a second area to store a WRITE control flag to control writing the retained data into the general purpose register unit, the data retained in the first pipeline register being allowed to be written back into the general purpose register when the WRITE control flag indicates "valid", a second pipeline register provided between the first stage and the second stage, one of a first arithmetic logic unit and a first memory to execute instruction in the second stage, the one of the first arithmetic logic unit and the first memory being supplied with data from the second pipeline register and supplying output data to the first pipeline register, a bypass circuit to selectively supply the data retained in the first pipeline register to the second pipeline register when the data validity flag indicates "valid," wherein the first pipeline register continues to retain the retained data even after the writing of the retained data into the general purpose register unit ends, and the first pipeline register supplies the retained data to the second pipeline register through the bypass circuit at the time of executing a subsequent instruction having data dependency on a preceding instruction.

Further another aspect of the present invention provides a pipeline processor having a first stage to read data from a general purpose register unit, a second stage to execute instruction, and a third stage to write back the data into the general purpose register unit, the pipeline processor, which comprises a first pipeline register to retain data obtained by executing the second stage, and to allow the data to be written back into the general purpose register unit, the first pipeline register being provided between the second stage and the third stage, the first pipeline register including a first area to store a data validity flag indicating validity of the retained data, a first WRITE suspension unit to suspend execution of writing the data retained in the first pipeline register into a general purpose register of the general purpose register unit, until the data retained in the first pipeline register is rewritten by a subsequent instruction, even if the data validity flag indicates "valid", and a data invalidation unit to cancel the suspended execution of writing the data retained in the first pipeline register into the general purpose register into which the data is to be written by a preceding instruction, and to invalidate the data retained in the first pipeline register, when data is written into the general purpose register by the subsequent instruction.

DETAILED DESCRIPTION OF THE INVENTION

Embodiments of the invention will be hereinafter described with reference to the drawings.

Figure 1:
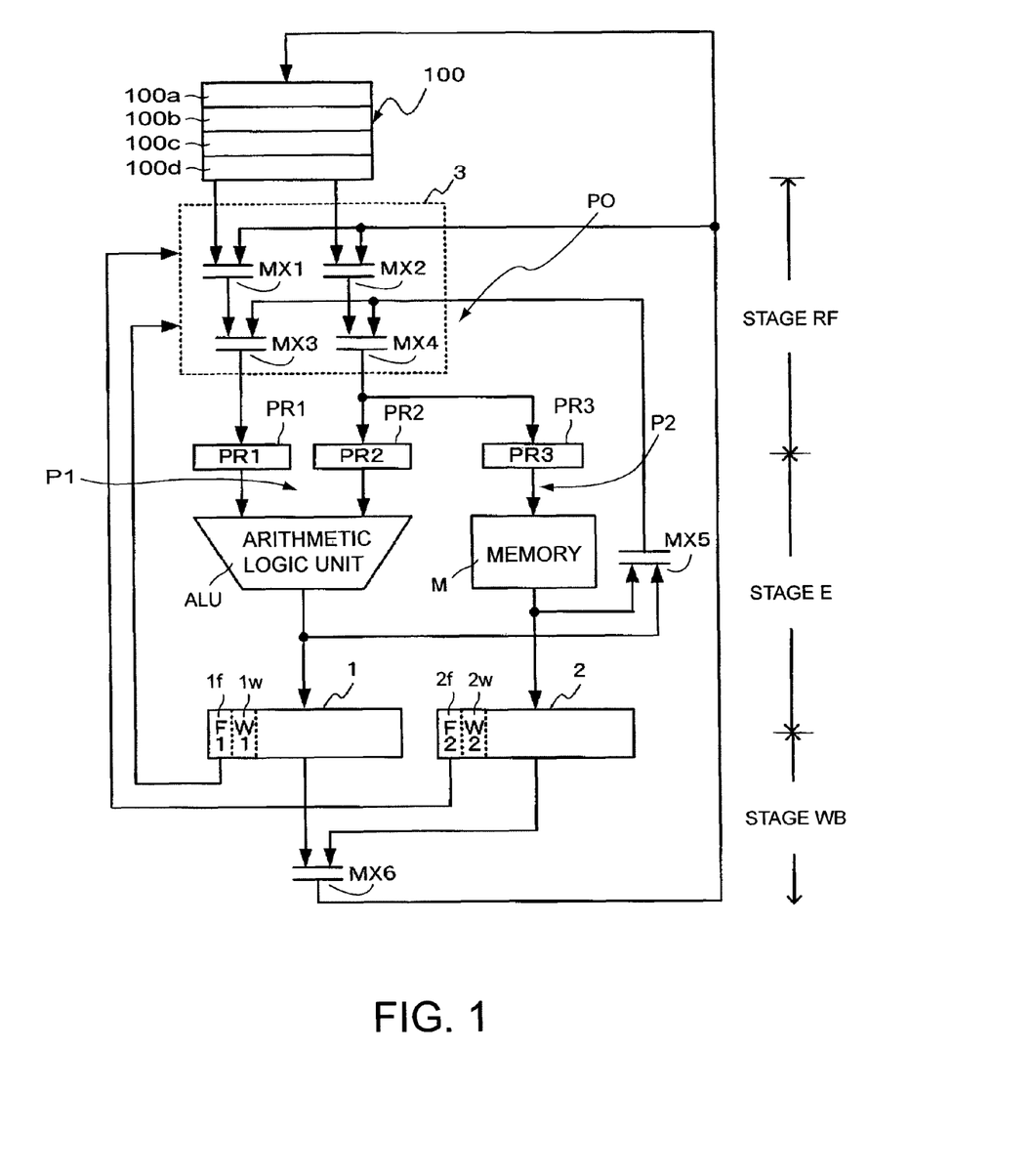
FIG. 1 is a block diagram showing a pipeline processor according to a first embodiment of the invention.

A first embodiment of a pipeline processor of the invention will be described with reference to FIG. 1. FIG. 1 is a block diagram showing the pipeline processor according to the first embodiment of the invention.

As shown in FIG. 1, the pipeline processor of the embodiment is provided with a general purpose register unit 100. The general purpose register unit 100 includes general purpose registers 100a to 100d which have different numbers respectively.

The pipeline processor of the embodiment has a pipeline structure which is composed of three stages including a stage RF, a stage E, and a stage WB. In the stage RF, data is read from one of the general purpose registers 100a to 100d of the general purpose register unit 100. In the stage E, an instruction is executed. In the stage WB, data is written back into one of the general purpose registers 100a to 100d.

The pipeline structure includes a pipeline P0. The pipeline P0 is branched into two pipelines P1, P2 in the stage E. In the pipeline P1, an arithmetic logic unit ALU corresponding to the stage E executes an instruction such as an arithmetic operation. In the pipeline P2, an instruction such as data loading or data storing to a memory M corresponding to the stage E is executed.

Pipeline registers 1, 2 and PR1 to PR3 are provided in boundary areas between the stages. The pipeline registers PR1, PR2, PR3 are placed between the stage RF and the stage E. The pipeline register 1 and the pipeline register 2 are placed between the stage E and the stage WB.

The pipeline register 1 retains output data of the arithmetic logic unit ALU. The pipeline register 2 retains output data of the memory M.

One of the data retained in the pipeline register 1 and the pipeline register 2 is selected and written back into the general purpose register unit 100 by a selector MX6.

The pipeline processor of the embodiment has a bypass circuit 3. The bypass circuit 3 includes selectors MX1 to MX4.

The bypass circuit 3 bypasses an output of the pipeline register 1 and an output of the pipeline register 2 outputted via the selector MX6, to the pipeline registers PR1, PR2, PR3 of the stage RF.

The selectors MX1, MX2 of the bypass circuit 3 select one of an output of the general purpose register unit 100 and either one of an output of the pipeline register 1 or an output of the pipeline register 2.

The bypass circuit 3 of the embodiment can bypass an output of the stage E which is outputted through the selector MX5. The output of the stage E means an output of the arithmetic logic unit ALU or an output of the memory M, instead of using data retained in the general purpose register unit 100. The selectors MX3, MX4 select one of an output of the selector MX5 and either one of outputs of the selector MX1, MX2 respectively.

The outputs of the selectors MX3, MX4 of the bypass circuit 3 are retained in the pipeline registers PR1 to PR3 respectively.

The pipeline register 1 described above has storage areas 1f, 1w. The storage area 1f stores a data validity flag F1 indicating validity of data retained by the pipeline register 1. The storage area 1w stores a WRITE control flag W1 to control writing of the data retained by the pipeline register 1, into the general purpose register 100.

The pipeline register 2 has storage areas 2f, 2w. The storage area 2f stores a data validity flag F2 indicating validity of data retained by the pipeline register 2. The storage area 2w stores a WRITE control flag W2 to control writing of the data retained by the pipeline register 2, into the general purpose registers 100. Each of the storage area 1f, 2f, 1w, 2w is 1 bit, for example.

Controlling and functions of the data validity flags F1, F2 and WRITE control flags W1, W2 will be described.

The data validity flag F1 and the WRITE control flag W1 are controlled as follows.

When an instruction reaches the stage WB in the pipeline P1 composed of the arithmetic logic unit ALU and the pipeline register 1, both the data validity flag F1 and the WRITE control flag W1 is set "valid ('1,' for example)."

In the stage WB, when a write is performed on the general purpose register 100a, for example, the WRITE control flag W1 is set "invalid ('0,' for example)." The data validity flag F1 remains as "valid ('1')."

After this, a subsequent instruction comes to the stage WB of the pipeline P1 on the arithmetic logic unit ALU side. When the subsequent instruction is one that is directed to rewriting the data retained in the first pipeline register 1, the data validity flag F1 is set "invalid ('0')."

Alternatively, whether or not a subsequent instruction is applied to the pipeline P1 on the arithmetic logic unit ALU side or the pipeline P2 on the memory M side, the data validity flag F1 is set "invalid ('0')," as long as the instruction is directed to writing data into the already-written general purpose register 100a and the instruction reaches the stage WB.

If the subsequent instruction is an instruction having data dependency with a preceding instruction and the data validity flag F1 indicates "valid ('1')," the data retained in the pipeline register 1 is used by means of the bypass circuit 3.

The data validity flag F2 and the write flag W2 will be controlled as follows.

When an instruction reaches the stage WB of the pipeline P2 composed of the memory M and the pipeline register 2, both the data validity flag F2 and the WRITE control flag W2 are set "valid ('1')."

In the stage WB, when a writing is performed on the general purpose register 100b, for example, the WRITE control flag W2 is set "invalid ('0')." The data validity flag F2 is remains as "valid ('1')."

After this, a subsequent instruction comes to the stage WB of the pipeline P2 on the memory M side in the stage WB. When the subsequent instruction is directed to rewriting the data retained in the first pipeline register 1, and when the instruction reaches the stage WB, the data validity flag F2 is set "invalid ('0')."

Alternatively, whether or not a subsequent instruction is applied to the pipeline P1 on the arithmetic logic unit ALU side or the pipeline P2 on the memory M side, the data validity flag F2 is set "invalid ('0')," as long as the instruction is a write instruction into the already-written general purpose register 100b.

If the subsequent instruction is an instruction having data dependency with a preceding instruction and the data validity flag F1 indicates "valid ('1')," the data retained in the pipeline register 2 is used by means of the bypass circuit 3.

Figure 2:
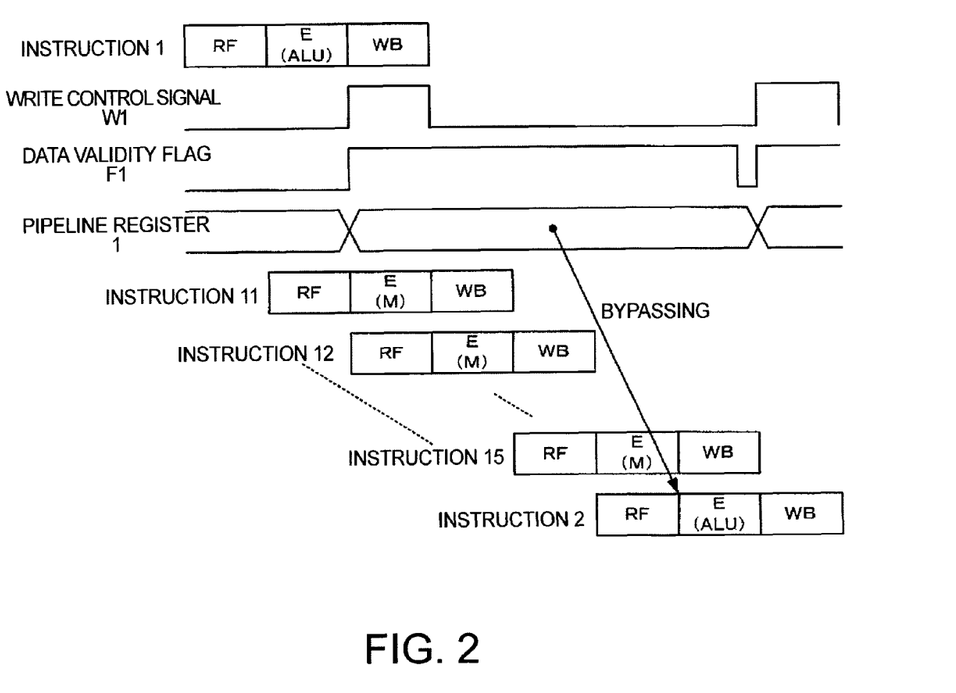
FIG. 2 is a view showing an example which indicates signal changes with respect to time in an operation of the pipeline processor according to the first embodiment.

An example of operation of the processor according to the first embodiment will be described with reference to FIG. 2. FIG. 2 is a view showing an example to indicate signal changes with respect to time in the operation of the pipeline processor according to the first embodiment. In FIG. 2, RF, E, and WB represent the stage RF, stage E, and stage WB, respectively.

In FIG. 2, an instruction 1 using the pipeline P1, which is provided on the side of the arithmetic logic unit ALU of FIG. 1, is executed. Output data from the arithmetic logic unit ALU is retained in the pipeline register 1. In FIG. 2, the operation thus performed causes the WRITE control flag W1 and the data validity flag F1 of the pipeline register 1 to be '1' (valid).

Since the WRITE control flag W1 is "valid," the data retained in the pipeline register 1 of FIG. 1 is written back into the general purpose register 100a, for example, through the selector MX6, while the data is still retained in the pipeline register 1.

Then, as shown in FIG. 2, the pipeline processor continuously receives instructions 11 to 15 using the pipeline 2 on the memory M side. Here, a typical operation by the instruction 11, for example, is described. As the instruction 11 is executed, output data from the memory M is retained in the pipeline register 2. The operation thus performed causes the WRITE control flag W2 and the data validity flag F2 of the pipeline register 2 of FIG. 1 to be '1' (valid).

Since the WRITE control flag W2 is "valid," the data retained in the pipeline register 2 of FIG. 1 is written back into the general purpose register 100b through the selector MX6, while the data is still retained in the pipeline register 2.

Then, subsequently, the processor receives an instruction 2 using the pipeline P1. The instruction 2 has data dependency with the instruction 1. The execution interval between the instruction 2 and the instruction 1 is long.

When the instruction 2 is executed, the validity flag F1 is "valid ('1')" in spite of the long execution interval between the instruction 1, 2, and data is not therefore read from the general purpose register 100a of FIG. 1. The data retained in the pipeline register 1 is read out and inputted into the pipeline register RP1 through the selector MX6 and the selector MX3 of the bypass circuit 3.

The embodiment allows data produced by a preceding instruction to be retained in the pipeline register 1, even if the execution interval between the preceding instruction and a subsequent instruction, which is data-dependent, is long. Thus, bypassing data from the pipeline register 1 at the time of executing a subsequent instruction makes it possible to execute the process without reading the data from the general purpose register 100a.

Consequently, the number of readings from the general purpose register 100a can be reduced, and thus power consumption can be reduced by the amount used for the readings of the general purpose register 100a.

In the embodiment described above, it is assumed that the instruction 11 and the instruction 12 of FIG. 2, for example, have data dependency to each other. Data of the memory M is inputted into and retained in the pipeline register 2. By this, both of the data validity flag F2 and the WRITE control flag W2 become "valid ('1')." The data retained in the pipeline register 2 is inputted into and retained in the general purpose register 100b, because the data validity flag F2 and the WRITE control flag W2 are "valid ('1').".

The data retained in the pipeline register 2 is read out and inputted into the pipeline register PR2, PR3 through the selector MX6 and the selectors MX2, MX4 of the bypass circuit 3, when the instruction 11 reaches the stage WB. Since the data validity flag F2 is "valid ('1')," data is not read from the general purpose register 100b of FIG. 1.

Figure 3:
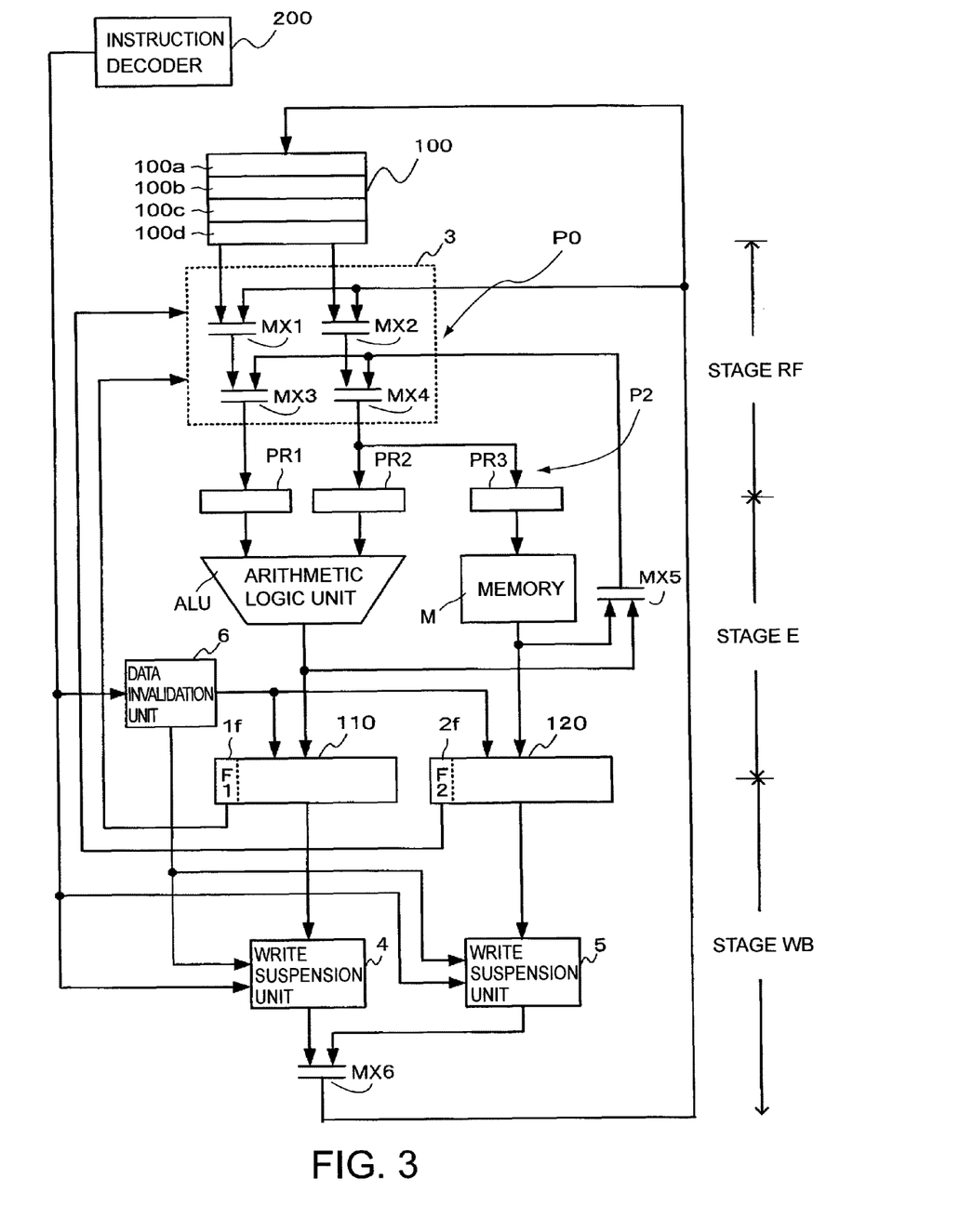
FIG. 3 is a block diagram showing a pipeline processor according to a second embodiment of the invention.

A second embodiment of the pipeline processor according to the invention will be described with reference to FIG. 3. FIG. 3 is a block diagram showing the pipeline processor according to the second embodiment.

In FIG. 3, the same reference numerals as those in FIG. 1 denote the same portions respectively.

As shown in FIG. 3, similar to the first embodiment, the pipeline processor of the embodiment has a pipeline structure having three stages composed of a stage RF, stage E, and stage WB. The pipeline processor further includes a bypass circuit 3 that includes the selector MX1 to MX4 as the first embodiment.

In the pipeline processor of the embodiment, pipeline registers 110, 120, which are provided between the stage E and the stage WB, have the validity flags F1, F2, but do not have the WRITE control flags W1, W2 as in the first embodiment of FIG. 1.

The pipeline processor of the embodiment includes WRITE suspension units 4, 5, and a data invalidation unit 6. The WRITE suspension units 4, 5 are configured to suspend write operation of data retained in the pipeline registers 110, 120 into the general purpose register unit 100. The data invalidation unit 6 cancels suspension performed by the WRITE suspension units 4, 5 and invalidates data retained in the pipeline registers 110, 120. Operations of the WRITE suspension units 4, 5 and the data invalidation unit 6 are controlled by output from an instruction decoder 200.

Even if the validity flags F1, F2 of the pipeline registers 110, 120 indicate "valid ('1')," the WRITE suspension units 4, 5 holds writing the data retained in the pipeline registers 110, 120 into the general purpose register unit 100, for example, until a subsequent instruction rewrites the pipeline registers 110, 120.

The data retained in the pipeline registers 110, 120 is written back into the general purpose register unit 100, for example, at the time when subsequent instructions overwrites the pipeline registers 110, 120.

If the subsequent instruction is an instruction to perform writing into the same (identical) general purpose register 100a, for example, as has been used by the preceding instruction, the data invalidation unit 6 cancels the writing into the general purpose register 100a to be performed by the preceding instruction, which has been suspended by the WRITE suspension unit 4 or the WRITE suspension unit 5. Such operation of the data invalidation unit 6 invalidates the data retained in the pipeline register 110 or the pipeline register 120.

Upon occurrence of a subsequent instruction to perform writing to the general purpose register, which has the same number as that written by the preceding instruction, the data retained in the pipeline register 110 or the pipeline register 120, which is the execution result of the preceding instruction, is invalidated without actually being written back into the general purpose register 100a.

Figure 4:
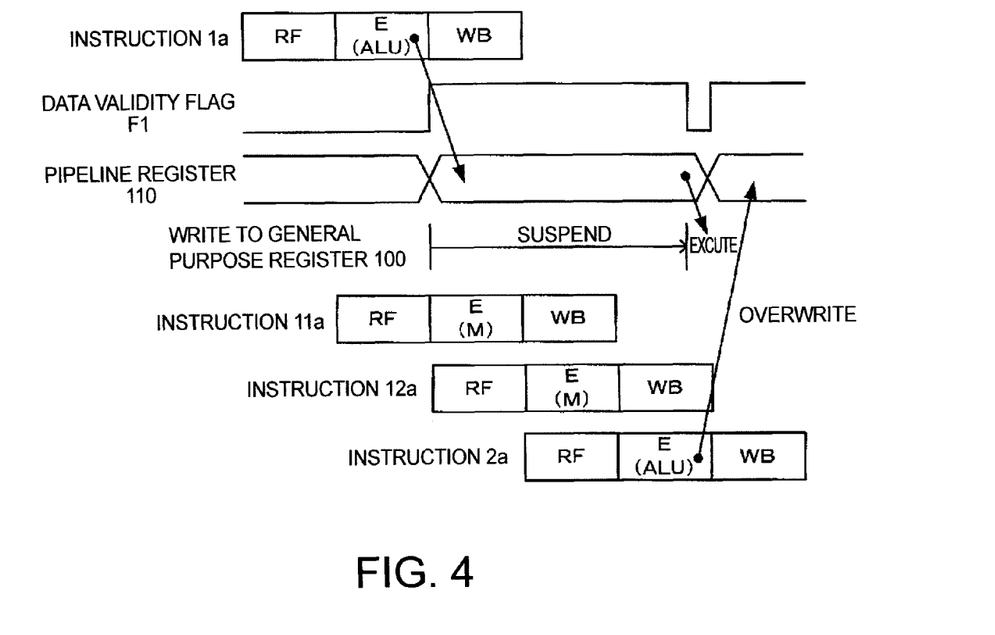
FIG. 4 is a view showing an example which indicates signal changes with respect to time in an operation of the pipeline processor according to the second embodiment.
Figure 5:
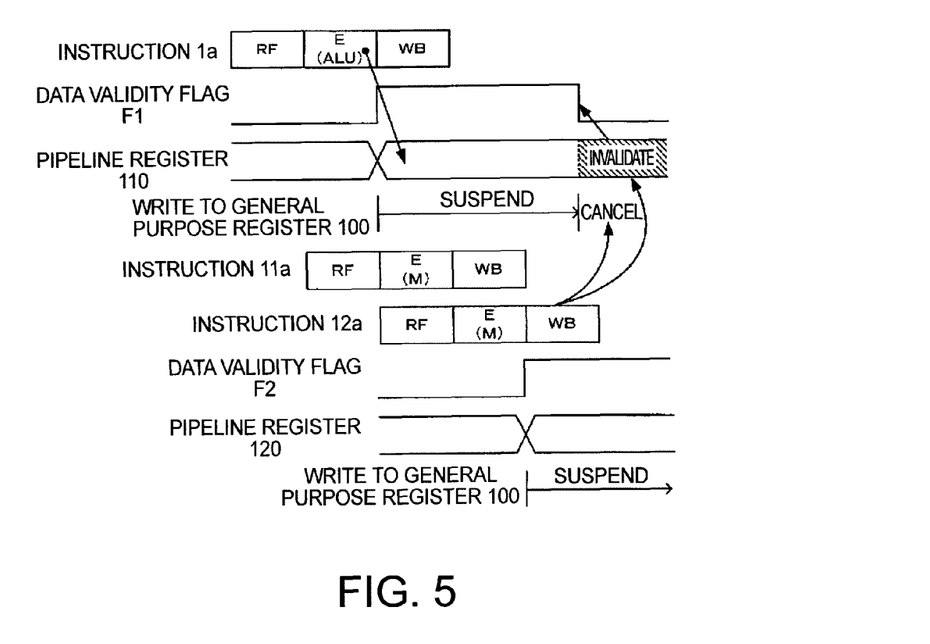
FIG. 5 is a view showing another example which indicates signal changes with respect to time in an operation of the pipeline processor according to the second embodiment.

An example of operation of the pipeline processor according to the second embodiment described above will be explained with reference to FIG. 4 and FIG. 5. FIG. 4 and FIG. 5 show signal changes with respect to time in the operation of the pipeline processor according to the second embodiment. In FIG. 4 and FIG. 5, RF, E, and WB represent the stage RF, stage E, and stage WB, respectively.

FIG. 4 shows the operation in which writing into the general purpose registers 100 is suspended.

In FIG. 4, an instruction 1a to use the pipeline P1 provided on the arithmetic logic unit ALU side, for example, is executed. When output of the arithmetic logic unit ALU is retained in the pipeline register 110, the validity flag F1 is set "valid ('1')." The WRITE suspension unit 4 suspends the write operation of the data retained in the pipeline register 110 into the general purpose register 100a.

Then, instructions 11a, 12a that use the pipeline P2 on the memory M side are executed consecutively. Thereafter, a subsequent instruction 2a to rewrite the pipeline register 110 is executed. The instruction 2a uses the pipeline P1 on the arithmetic logic unit ALU side.

As the instruction 2a is executed, suspension by the WRITE suspension units 4 is canceled. At the time when data obtained from the arithmetic logic unit ALU is overwritten by the data retained in the pipeline register 110, the execution result of the preceding instruction 1a that has been retained in the pipeline register 110 is written back into the general purpose register unit 100.

FIG. 5 shows an operation to invalidate data retained in the pipeline registers 110.

In FIG. 5, the instruction 1a, which uses the pipeline P1 provided on the arithmetic logic unit ALU side, for example, is executed. As the instruction 1a is executed, an output of the arithmetic logic unit ALU is retained in the pipeline register 110. Consequently, the validity flag F1 of the pipeline register 110 becomes "valid ('1')." The WRITE suspension unit 4 suspends the writing of the data retained in the pipeline register 110 into the general purpose register 100a, for example.

Then, the instruction 11a that uses the pipeline P2 provided on the memory M side is executed. After the execution of the instruction 11a, the instruction 12a is executed. The instruction 12a is an instruction that uses the pipeline P2 provided on the memory M side. The instruction 12a is an instruction to write into the same (identical) general purpose register 100a as that to be written by a preceding instruction.

As the instruction 12a is executed, the write operation of the data retained in the pipeline register 110 based on the instruction 1a to write into the general purpose register 100a, which is suspended by the WRITE suspension unit 4, is cancelled. The data retained in the pipeline register 110 is invalidated by the data invalidation unit 6. With the invalidation, the validity flag F1 becomes '0' (invalid).

According to the instruction 12a, an output of the memory M is retained in the pipeline register 120. By the operation, the validity flag F2 of the pipeline register 120 becomes '1' (valid). Consequently, the writing of the data retained in the pipeline register 120 into the general purpose register 100a is suspended by the WRITE suspension unit 5.

According to the embodiment, even when a preceding instruction reaches the stage WB, the write operation into the general purpose register 100a is suspended, unless a subsequent instruction comes to the same (identical) pipeline as the preceding instruction.

In the case where the subsequent instruction is an instruction to perform writing to the same (identical) general purpose register 100a as has been used by the preceding instruction, the write operation of the preceding instruction into the general purpose register unit 100 is cancelled. This can reduce the number of writing operations into the general purpose register 100a. As a result, power consumption, which may be caused by write operations into the general purpose registers, is reduced.

Also in the embodiment, similar to the first embodiment, the bypassing of the data retained in the pipeline registers 110, 120 can be performed. Even if the execution interval is long between an preceding instruction and a subsequent instruction which is data-dependent, the bypassing is capable of performing the process without reading the data from the general purpose register unit 100, when a subsequent instruction is executed.

Hence, the number of reading operations from the general purpose register unit 100 can be reduced. Thus, power consumption, which may be caused by the read operations from the general purpose registers, can be also reduced.

In the embodiments described above, the arithmetic logic unit ALU and the memory M are used in the stage E. Another arithmetic logic unit may be used instead of the memory M.

In the embodiments, only three stages and two pipelines are used to constitute a pipeline processor in order to simplify the description. The numbers of stages and pipelines are not limited to those of the embodiments to implement the invention.

Other embodiments or modifications of the invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A pipeline processor having a first stage to read data from a general purpose register unit, a second stage to execute instruction, and a third stage to write back the data into the general purpose register unit, the pipeline processor comprising:
    a first pipeline register to retain data obtained by executing the second stage, and to allow the data to be written back into the general purpose register unit, the first pipeline register being provided between the second stage and the third stage, the first pipeline register including a first area to store a data validity flag indicating validity of the retained data;
    a first WRITE suspension unit to suspend execution of writing the data retained in the first pipeline register into a general purpose register of the general purpose register unit, until the data retained in the first pipeline register is rewritten by a subsequent instruction, even if the data validity flag indicates "valid;" and
    a data invalidation unit to cancel the execution of writing the data retained in the first pipeline register into the general purpose register into which the data is to be written by a preceding instruction and to invalidate the data retained in the first pipeline register, when data is written into the general purpose register by the subsequent instruction.

2. The pipeline processor according to claim 1, further comprising a bypass circuit to supply the data retained in the first pipeline register to the second stage when the data validity flag indicates "valid."

3. The pipeline processor according to claim 1, wherein the data validity flag becomes "valid" when the instruction reaches the third stage.

4. The pipeline processor according to claim 3, wherein the data validity flag becomes "valid" when the preceding instruction reaches the third stage, and the data validity flag continues to be "valid" until the data retained in the first pipeline register is rewritten by the subsequent instruction.

5. The pipeline processor according to claim 1, further comprising:
    a second pipeline register provided between the first stage and the second stage;
    one of a first arithmetic logic unit and a first memory to execute the instruction in the second stage, the one of a first arithmetic logic unit and a first memory being supplied with data from the second pipeline register and supplying output data to the first pipeline register; and
    a bypass circuit to selectively read the data retained in the first pipeline register and to supply the data to the second pipeline register, when the data validity flag indicates "valid," wherein
    the first pipeline register continues to retain the retained data, even after the writing of the retained data into the general purpose register, until the data invalidation unit invalidates the data retained in the first pipeline register.

6. The pipeline processor according to claim 5, wherein the bypass circuit includes a first selector, and
    the first selector selectively supplies one of the data retained in the general purpose register and the data retained in the first pipeline register, to the second pipeline register, depending on the data validity flag of the first pipeline register.

7. The pipeline processor according to claim 6, further comprising:
    a third pipeline register provided between the second stage and the third stage, the third pipeline register including a second area to store a data validity flag indicating validity of data retained in the third pipeline register;
    a fourth pipeline register provided between the first stage and the second stage;
    one of a second arithmetic logic unit and a second memory to execute the second stage, the one of the second arithmetic logic unit and the second memory being supplied with data from the fourth pipeline register and supplying output data to the third pipeline register;
    a second WRITE suspension unit to suspend writing the data retained in the third pipeline register into the general purpose register unit until the data retained in the third pipeline register is rewritten by a subsequent instruction, even if the data validity flag indicates "valid"; and
    a second selector to selectively supply the data retained in the first pipeline register and the data retained in the second pipeline register to the bypass circuit and a general purpose register of the general purpose register unit through the second WRITE suspension unit, wherein
    the bypass circuit has a third selector, and
    the third pipeline register selectively supplies the retained data to the fourth pipeline register through the third selector of the bypass circuit, and
    a data invalidation unit to cancel the suspended execution of the writing of the data retained in the third pipeline register into the general purpose register into which the data is to be written by a preceding instruction, and to invalidate the data retained in the third pipeline register, when data is written into the general purpose register by the subsequent instruction.

8. The pipeline processor according to claim 5, wherein the bypass circuit has a fourth selector, and
    the fourth selector supplies an output of one of the first arithmetic logic unit and the first memory selectively to the second pipeline register.

9. The pipeline processor according to claim 8, further comprising:
    a fourth pipeline register provided between the first stage and the second stage;
    one of a second arithmetic logic unit and a second memory which correspond to the second stage; and
    a fifth selector, wherein
    the bypass circuit includes a sixth selector to selectively supply an output of the fifth selector and an output of the third selector to the fourth pipeline register, and
    the fifth selector selectively supplies an output of one of the first arithmetic logic unit and the first memory and an output of one of the second arithmetic logic unit and the second memory to the fourth selector and the sixth selector of the bypass circuit.

10. A pipeline processor having a first stage to read data from a general purpose register unit, a second stage to execute instruction, and a third stage to write back the data into the general purpose register unit, the pipeline processor comprising:

a first pipeline register to retain data obtained by executing the second stage, and to allow the data to be written back into the general purpose register unit, the first pipeline register being provided between the second stage and the third stage, the first pipeline register including a first area to store a data validity flag indicating validity of the retained data;

a first WRITE suspension unit to start suspending execution of writing the data retained in the first pipeline register into a general purpose register of the general purpose register until when the preceding instruction is received for the writing, the first WRITE suspension unit suspending execution of the writing until the suspension is canceled in response to a subsequent instruction for overwriting the data retained in the first pipeline register, even if the data validity flag indicates "valid;" and a data invalidation unit to cancel the execution of writing the data retained in the first pipeline register into the general purpose register into which the data is intended to be written by a preceding instruction and to invalidate the data retained in the first pipeline register, when data produced based on the subsequent instruction is intended to be written into the same general purpose register by the subsequent instruction, wherein the data produced based on the subsequent instruction is newly retained in the first pipe line register or another pipeline register of the general purpose register unit, execution of writing the retained data into the general purpose register is suspended, and the data validity flag of the first pipeline register or the other pipeline register indicates validity of the retained data.

11. The pipeline processor according to claim 10, further comprising a bypass circuit to supply the data retained in the first pipeline register to the second stage when the data validity flag indicates "valid."

12. The pipeline processor according to claim 10, wherein the data validity flag becomes "valid" when the instruction reaches the third stage.

13. The pipeline processor according to claim 12, wherein the data validity flag becomes "valid" when the preceding instruction reaches the third stage, and the data validity flag continues to be "valid" until the data retained in the first pipeline register is rewritten by the subsequent instruction.

14. The pipeline processor according to claim 10, further comprising:

a second pipeline register provided between the first stage and the second stage;

one of a first arithmetic logic unit and a first memory to execute the instruction in the second stage, the one of a first arithmetic logic unit and a first memory being supplied with data from the second pipeline register and supplying output data to the first pipeline register; and a bypass circuit to selectively read the data retained in the first pipeline register and to supply the data to the second pipeline register, when the data validity flag indicates "valid", wherein the first pipeline register continues to retain the retained data, even after the writing of the retained data into the general purpose register, until the data invalidation unit invalidates the data retained in the first pipeline register.

15. The pipeline processor according to claim 14, wherein the bypass circuit includes a first selector, and the first selector selectively supplies one of the data retained in the general purpose register and the data retained in the first pipeline register, to the second pipeline register, depending on the data validity flag of the first pipeline register.

16. The pipeline processor according to claim 15, further comprising:

a third pipeline register, as the other pipeline register, provided between the second stage and the third stage, the third pipeline register including a second area to store a data validity flag indicating validity of data retained in the third pipeline register;

a fourth pipeline register provided between the first stage and the second stage;

one of a second arithmetic logic unit and a second memory to execute the second stage, the one of the second arithmetic logic unit and the second memory being supplied with data from the fourth pipeline register and supplying output data to the third pipeline register;

a second WRITE suspension unit to suspend writing the data retained in the third pipeline register into the general purpose register unit until the data retained in the third pipeline register is rewritten by a subsequent instruction, even if the data validity flag indicates "valid"; and a second selector to selectively supply the data retained in the first pipeline register and the data retained in the second pipeline register to the bypass circuit and a general purpose register of the general purpose register unit through the second WRITE suspension unit, wherein the bypass circuit has a third selector, and the third pipeline register selectively supplies the retained data to the fourth pipeline register through the third selector of the bypass circuit, and a data invalidation unit to cancel the suspended execution of the writing of the data retained in the third pipeline register into the general purpose register into which the data is to be written by a preceding instruction, and to invalidate the data retained in the third pipeline register, when data is written into the general purpose register by the subsequent instruction.

17. The pipeline processor according to claim 14, wherein the bypass circuit has a fourth selector, and the fourth selector supplies an output of one of the first arithmetic logic unit and the first memory selectively to the second pipeline register.

18. The pipeline processor according to claim 17, further comprising:

a fourth pipeline register provided between the first stage and the second stage;

one of a second arithmetic logic unit and a second memory which correspond to the second stage; and a fifth selector, wherein the bypass circuit includes a sixth selector to selectively supply an output of the fifth selector and an output of the third selector to the fourth pipeline register, and the fifth selector selectively supplies an output of one of the first arithmetic logic unit and the first memory and an output of one of the second arithmetic logic unit and the second memory to the fourth selector and the sixth selector of the bypass circuit.

* * * * *